United States Patent
Eckert et al.

(10) Patent No.: US 6,607,210 B2
(45) Date of Patent: Aug. 19, 2003

(54) AIRBAG MODULE AND ARRANGEMENT AND METHOD THEREOF IN A VEHICLE

(75) Inventors: Nick Eckert, Berlin (DE); Carsten Haase, Berlin (DE); Martin Kamm, Berlin (DE); Claude Rion, Ingolstadt (DE); Udo Spies, Gaimershaim (DE); Martin Neff, Ingolstadt (DE); Gerd Radtke, Berlin (DE)

(73) Assignees: Takata-Petri AG, Aschaffenburg (DE); Audi AG, Ingolstadt (DE)

(*) Notice: Subject to any disclaimer, the term of this patent is extended or adjusted under 35 U.S.C. 154(b) by 15 days.

(21) Appl. No.: 09/893,511

(22) Filed: Jun. 29, 2001

(65) Prior Publication Data

US 2002/0109341 A1 Aug. 15, 2002

Related U.S. Application Data

(63) Continuation of application No. PCT/DE99/04030, filed on Dec. 10, 1999.

(30) Foreign Application Priority Data

Dec. 30, 1998 (DE) .......................................... 198 60 932

(51) Int. Cl.⁷ ............................................... B60R 21/16
(52) U.S. Cl. .................................... 280/732; 280/743.1
(58) Field of Search ............................. 280/731, 732, 280/743.1, 743.2, 729

(56) References Cited

U.S. PATENT DOCUMENTS

| | | | |
|---|---|---|---|
| 5,420,413 A | 5/1995 | Mossi et al. ................. | 280/729 |
| 5,513,877 A * | 5/1996 | MacBrien et al. ........... | 280/732 |
| 5,520,413 A * | 5/1996 | Mossi et al. ................. | 280/729 |
| 5,575,497 A | 11/1996 | Suyama et al. ............. | 280/730 |
| 5,577,765 A | 11/1996 | Takeda et al. .............. | 280/729 |
| 5,593,179 A * | 1/1997 | Maruyama ................... | 280/740 |
| 5,692,774 A * | 12/1997 | Acker et al. ................. | 280/729 |
| 5,746,447 A | 5/1998 | Dyer et al. .............. | 280/743.2 |

FOREIGN PATENT DOCUMENTS

| | | | | |
|---|---|---|---|---|
| DE | 2 248 393 | 4/1973 | ........... | B60R/21/10 |
| DE | 42 35 761 | 6/1995 | ........... | B60R/21/16 |
| DE | 296 20 298 | 4/1997 | ........... | B60R/21/20 |
| DE | 196 24 371 | 1/1998 | ........... | B60R/21/16 |
| DE | 297 13 111 | 3/1998 | ........... | B60R/21/24 |
| DE | 297 13 112 | 3/1998 | ........... | B60R/21/26 |
| EP | 0 861 762 | 9/1998 | ........... | B60R/21/24 |
| JP | 406227353 A * | 8/1994 | ................. | 280/732 |

* cited by examiner

*Primary Examiner*—Paul N. Dickson
*Assistant Examiner*—Faye M. Fleming

(57) ABSTRACT

An airbag arrangement and method includes an airbag module, which has a module housing and an airbag. The airbag is arranged so that it sequentially unfolds in various directions so that it ultimately becomes positioned in front of the passenger. The airbag has two sections, a first chamber and a second chamber. The first chamber inflates first and is forced to travel substantially laterally along the dashboard toward the A-frame, and rests there or the windshield or both. The airbag is twistingly connected relative to the housing so that as the first chamber inflates, it rests against the windshield or the A-frame and applies a torque thereagainst to stably position the first chamber. The first chamber becomes substantially centered about the front seat. Thereafter, the second chamber inflates toward the seat or the passenger seated therein.

17 Claims, 9 Drawing Sheets

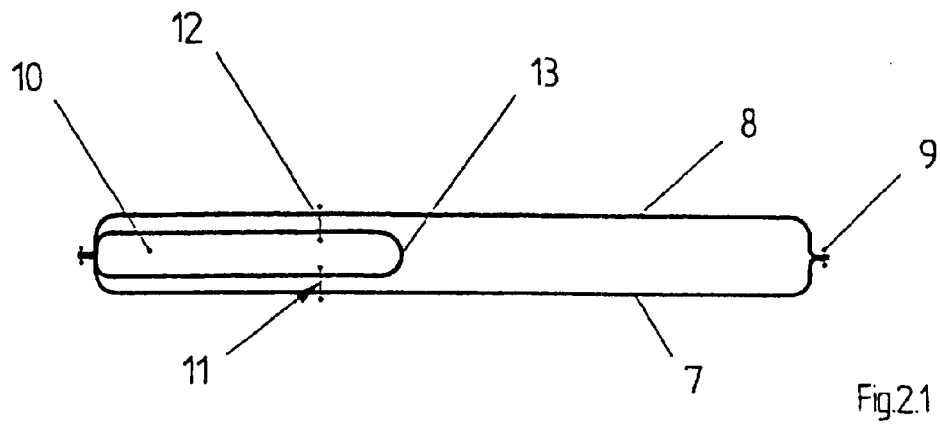
Fig.2.1
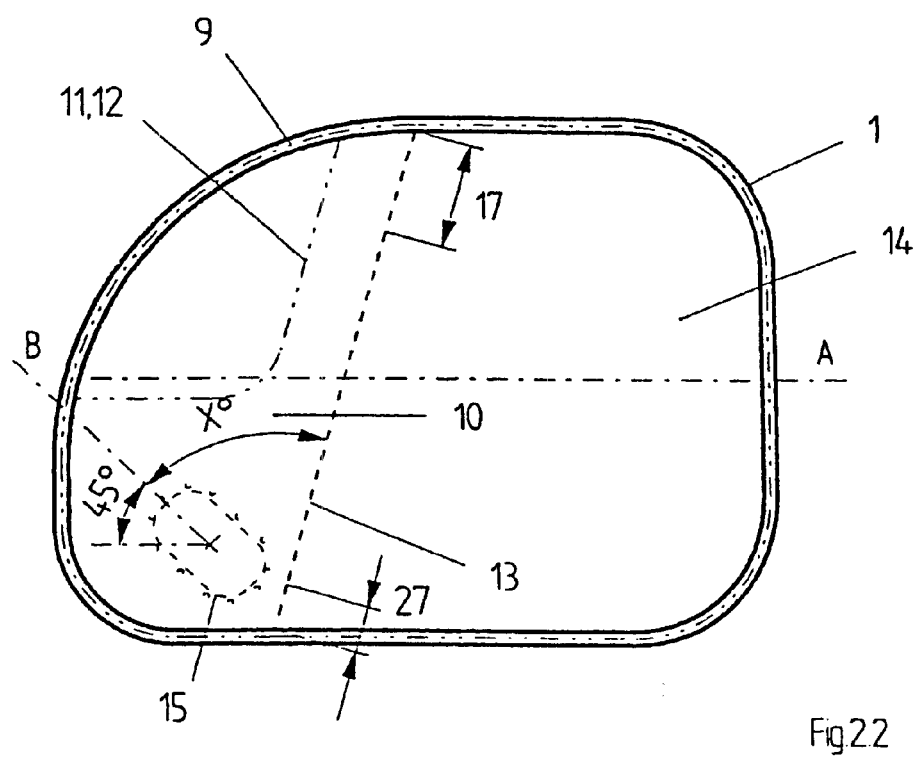
Fig.2.2

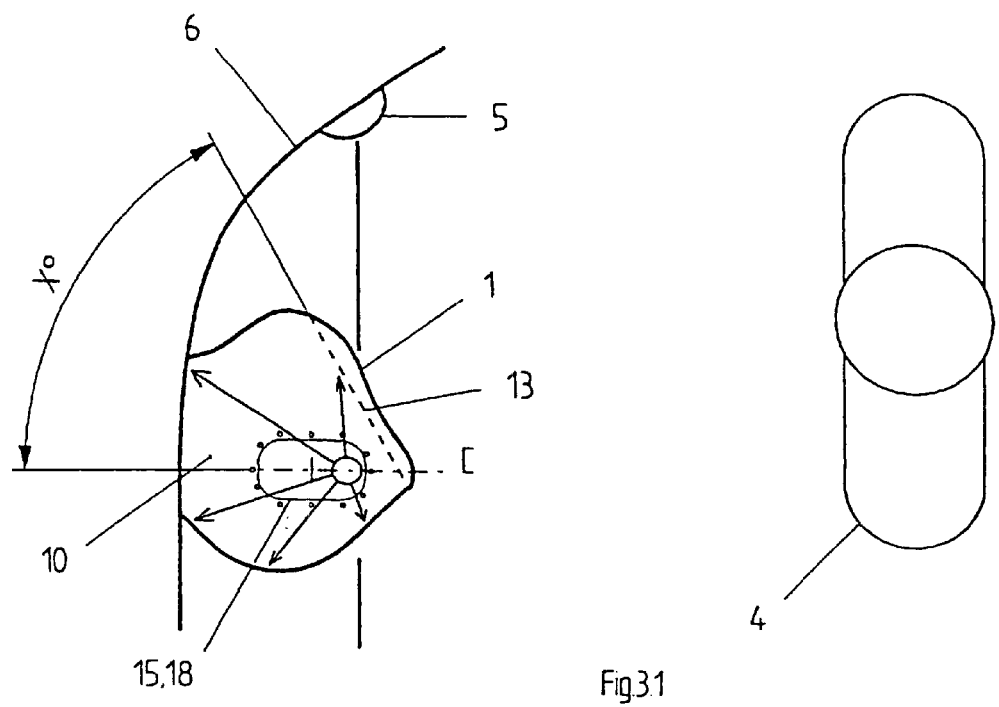
Fig.3.1
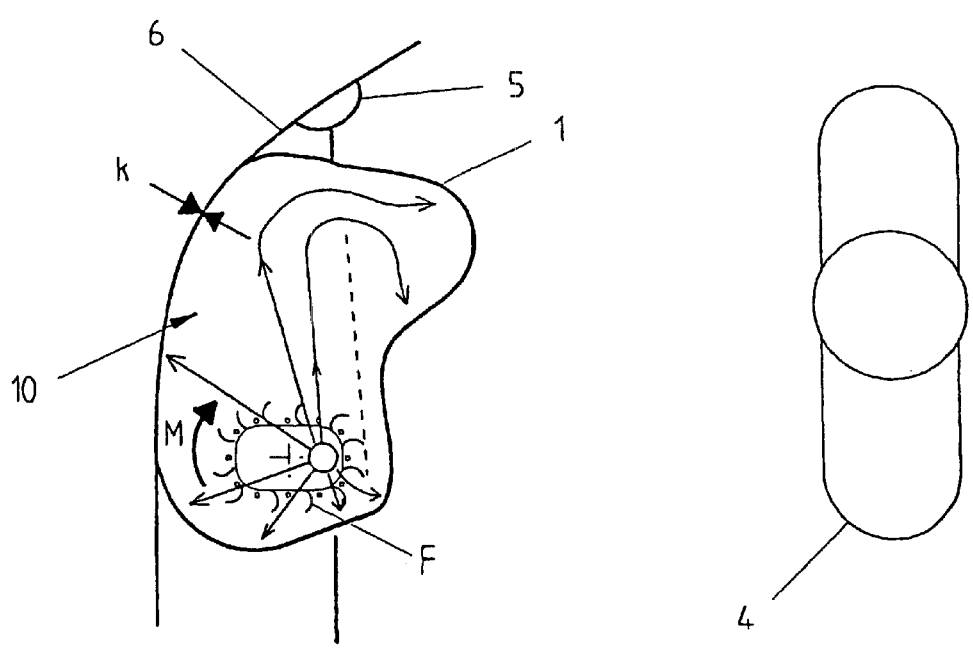
Fig.3.2

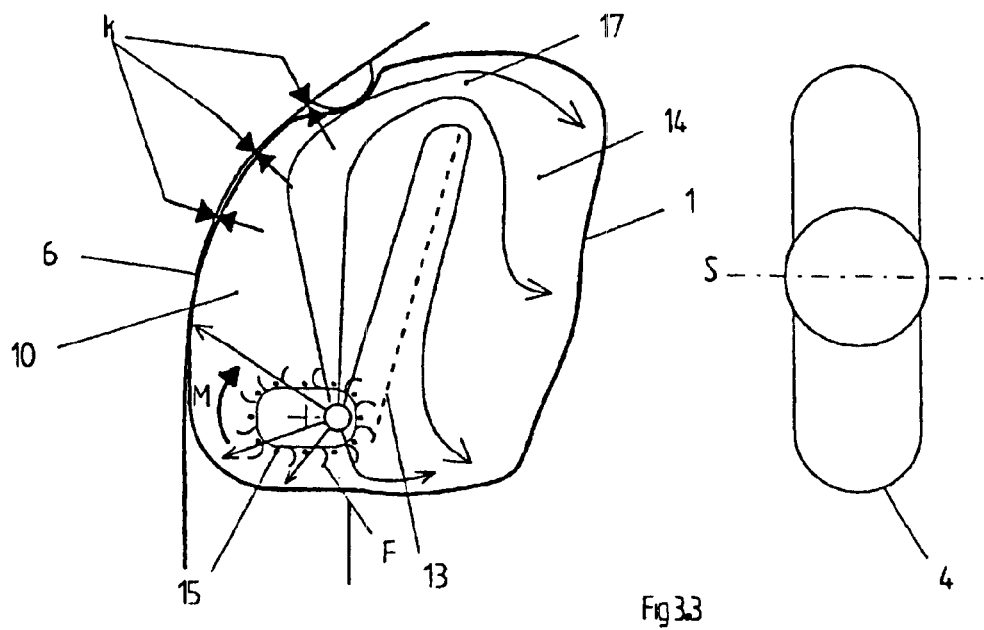
Fig 3.3
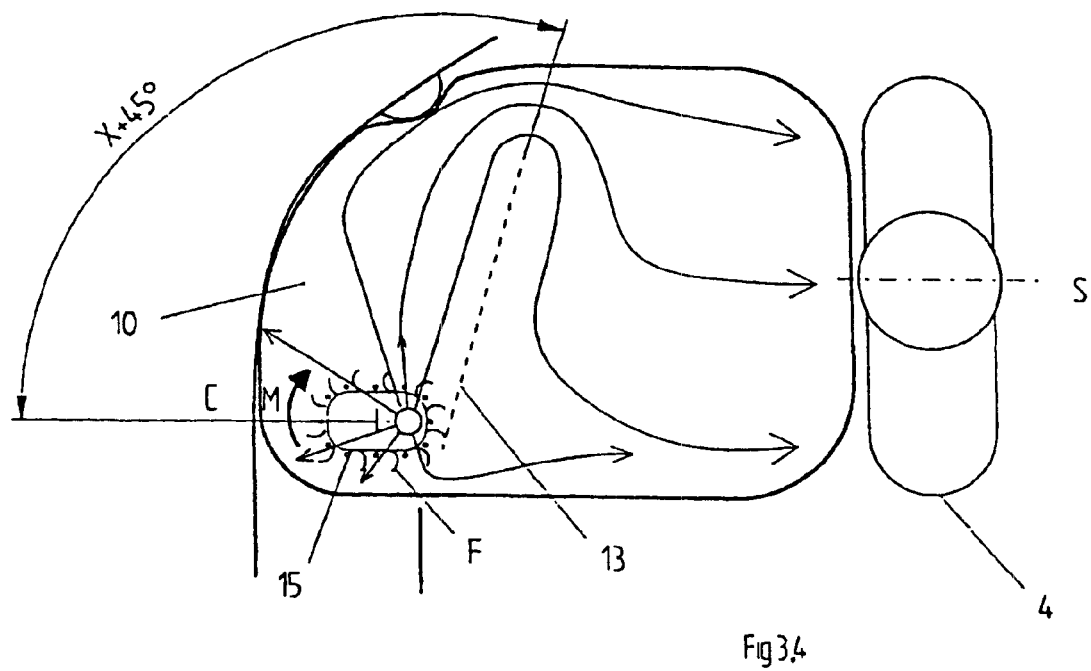
Fig 3.4

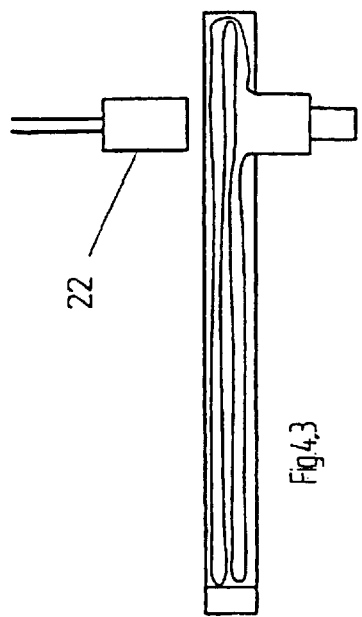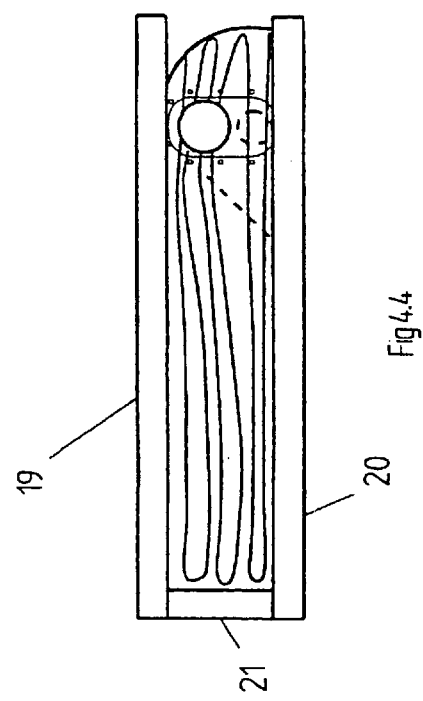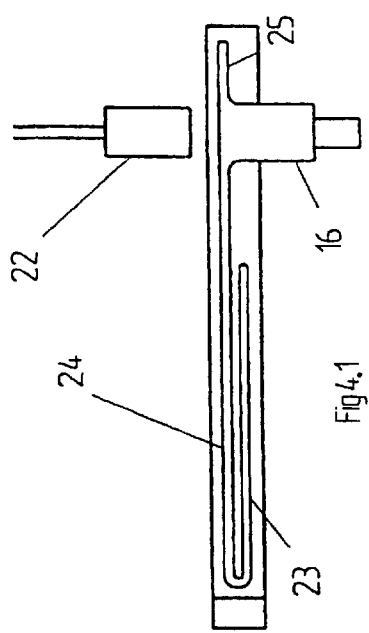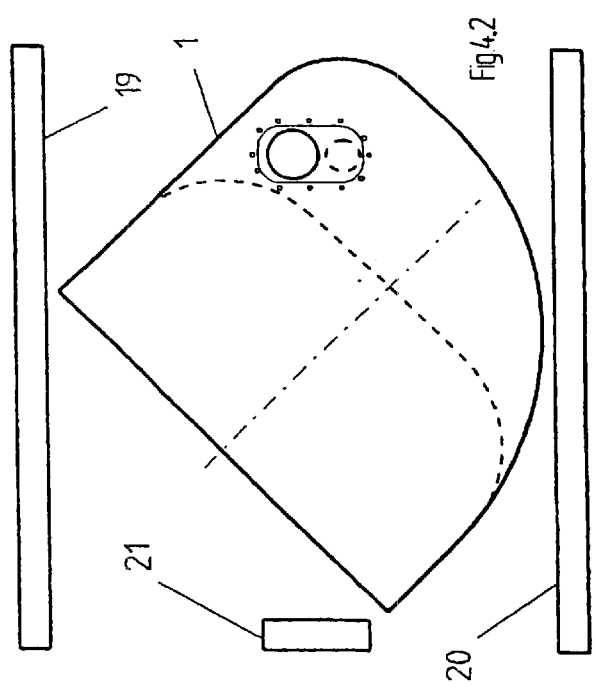

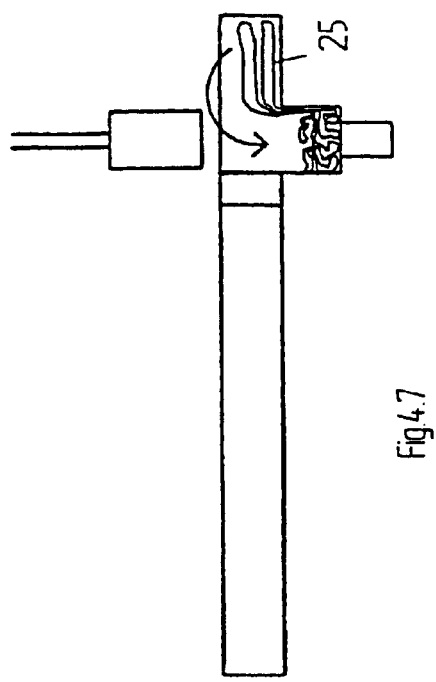
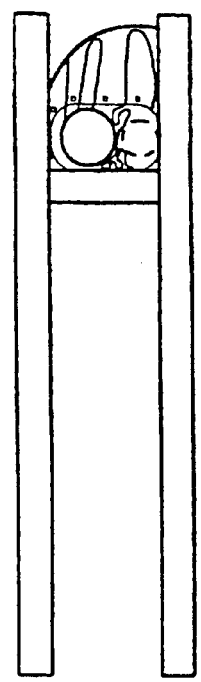
Fig.4.7
Fig.4.8
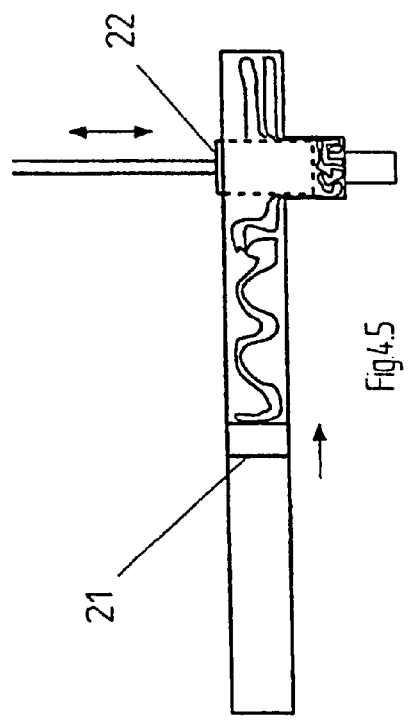
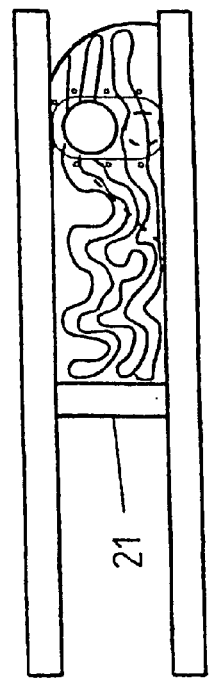
Fig.4.5
Fig.4.6

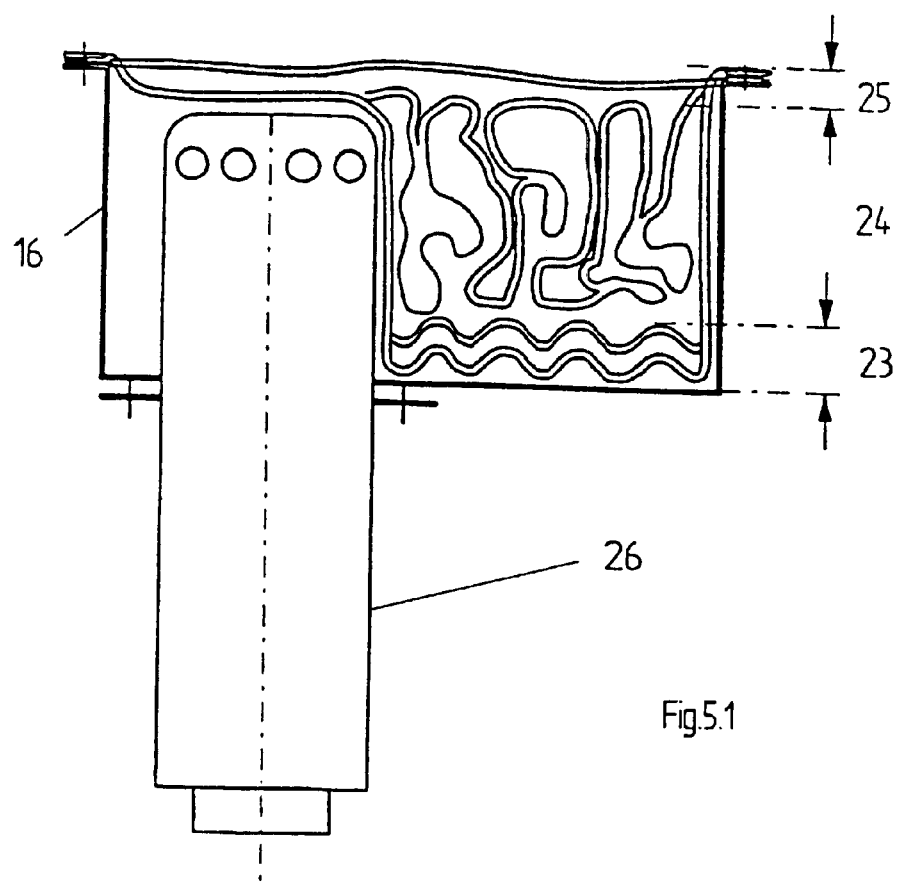
Fig.5.1
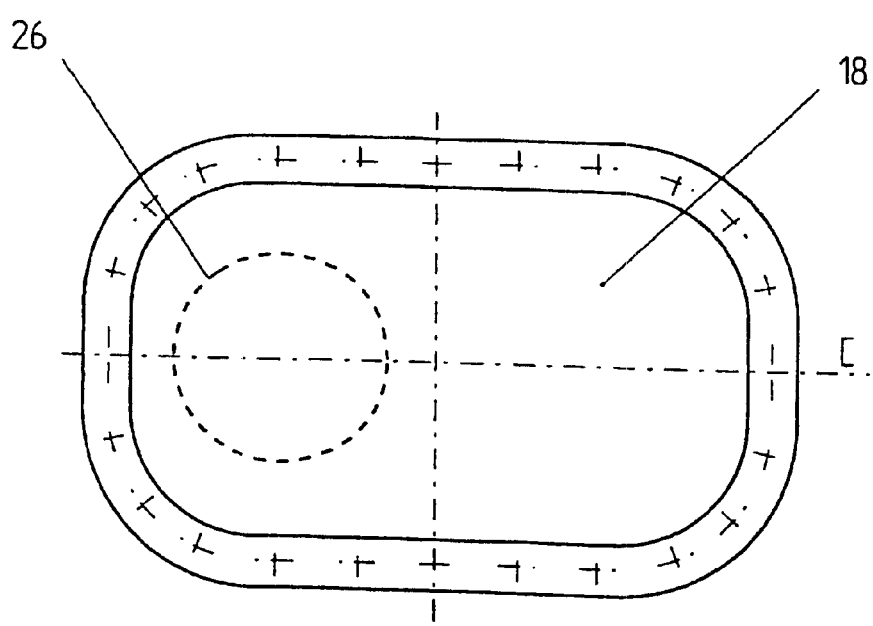
Fig.5.2

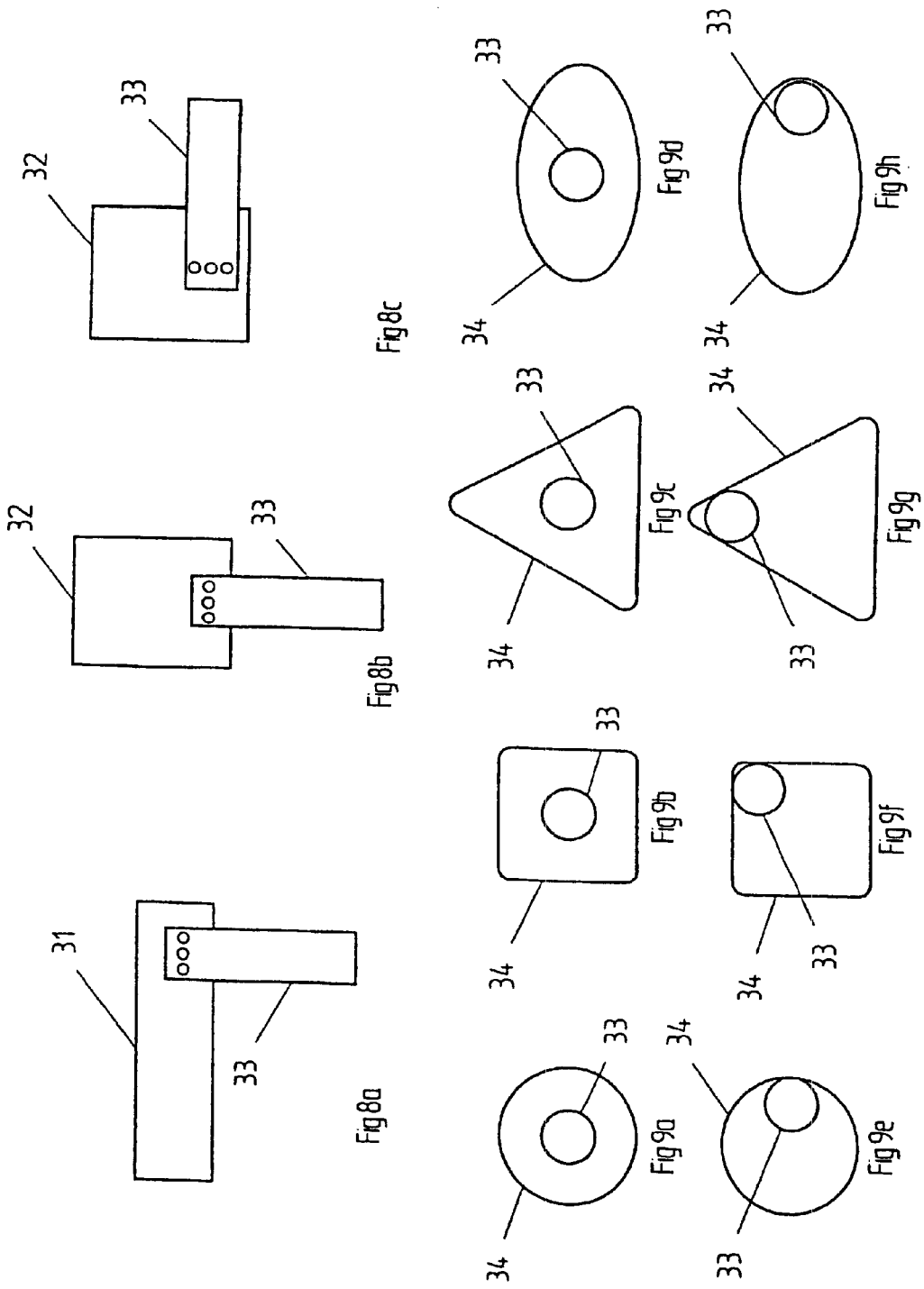

AIRBAG MODULE AND ARRANGEMENT AND METHOD THEREOF IN A VEHICLE

This is a continuation of International Application PCT/DE99/04030, with an international filing date of Dec. 10, 1999; this international application was not published in English, but in German, as WO 00/40439.

BACKGROUND

An airbag module is typically positioned symmetrically in front of a passenger, i.e., symmetrically with the passenger's central bodyline, for protecting the passenger against a frontal impact. For protecting the driver, an airbag module is thus placed in the steering wheel, and for protecting the front passenger, another airbag module is placed in the dashboard. The front passenger's airbag module, however, takes up valuable space, which can be otherwise usable for placing other instrument panels or other uses, such as a larger front compartment. Accordingly, it is desirable to place the front passenger airbag module at another location.

In this regard, a German patent publication, DE 196 24 371 A1, discloses an airbag module fitted in the center console of the vehicle. An airbag is design to deploy essentially transversely with respect to the vehicle travel direction. This is disadvantageous in that the front passenger can be struck from the side or that the airbag may not be placed in its intended protective position, namely in front of the passenger.

U.S. Pat. No. 5,575,497 discloses an airbag module arranged on the backrest of a vehicle seat. The airbag module has two airbags that are connected to each other via valves. When the airbag module activates, one of the two airbag deploys. This airbag is positioned between the occupant and the side door. When the deployed airbag reaches a certain pressure, its valves open to deploy the other airbag transversely across the occupant. Even with this arrangement, there is the risk of the later deploying airbag striking the side of the occupant or that the airbag may not be placed in its intended position, namely in front of the passenger.

Accordingly, there is a need for an airbag module that reliably deploys the airbag from the front of the occupant. The present invention addresses this need.

SUMMARY OF THE INVENTION

The present invention relates to an airbag module designed to deploy its airbag component in front of the occupant. One aspect of the present invention relates to an airbag module, another one to an airbag arrangement, and another one to a method of deploying an airbag.

The airbag arrangement and the method can include the airbag module according to the present invention. In this respect, the airbag module includes a module housing, an airbag, and a gas generator. The housing can have a connection opening. The airbag can also have a connection opening. The airbag is connected to the housing with the connection openings aligned with each other. The airbag can have a first chamber, a second chamber separated from the first chamber by a separation line, and an overflow opening communicating the first and second chambers. The gas generator can supply gas to the airbag via the connection openings.

The airbag connection opening is provided on one side of the first chamber and the overflow opening is provided on an opposite side of the first chamber. When the airbag deploys, the separation line between the first and second chambers is positioned substantially transversely with respect to a longitudinal axis of the vehicle. The airbag is twisted about the module housing, substantially about an axis of the housing connection opening so that as the first chamber inflates, the first chamber rests against a vehicle part and applies or generates a torque against which the first chamber can be stably positioned. The second chamber expands in front of and toward a vehicle seat or the occupant after the first chamber has been stably positioned.

The first chamber is shorter and smaller than the second chamber. The smaller chamber can be a separate pocket provided in the airbag. The pocket can be connected to opposite sides of the airbag at at least one point on each side via seams or catch straps. The airbag has a lower panel and an upper panel connected to each other with a circumferential seam. The lower panel can have the airbag connection opening that connects the airbag to the module housing. The pocket can be attached to the circumferential seam and can be connected in a central region in a curved manner to the lower and upper panels. The airbag can be rectangular and can have rounded corners in an unfolded, non-inflated state.

The airbag can be configured to deploy in three sequential phases, which comprises a) a first phase in which the airbag deploys vertically out of the housing connection opening, b) a second phase in which the airbag deploys substantially laterally, and c) a third phase in which the airbag deploys rearwardly, toward the passenger.

The module housing can be cup-shaped for accommodating the airbag in a folded, uninflated state, and can be arranged under a vehicle dashboard, into which the gas generator protrudes from below.

The airbag arrangement and the method can include the above features of the airbag module. The airbag module can be arranged along a center of a vehicle dashboard, and the housing connecting opening can be located on the upper side of the dashboard facing the center of the vehicle, and the overflow opening can be provided on a side of the airbag facing the right-hand side of the vehicle. The airbag in an unfolded, non-inflated position can extend obliquely in the direction of a front passenger.

The airbag can be folded and positioned inside the housing with the airbag connection opening downward, and the first and second chambers tucked inside the housing, and the rest of the airbag lying thereover in the housing.

The airbag is twisted about 45° with respect to the longitudinal axis of the vehicle. The vehicle part can be a windshield or an A-pillar of the vehicle.

The method can comprise providing the airbag module, providing the airbag connection opening on one side of the first chamber and the overflow opening on an opposite side of the first chamber, placing the separation line between the first and second chambers substantially transversely with respect to a longitudinal axis of the vehicle, connecting the airbag twisted about the module housing, substantially about an axis of the housing connection opening so that as the first chamber inflates, the first chamber rests against a vehicle part and generates or applies a torque against which the first chamber is stably positioned, and inflating the second chamber after the first chamber has been stably positioned.

The method can also comprise providing the airbag module, providing the connection opening on one side of the first chamber and the overflow opening on an opposite side of the first chamber, substantially vertically moving the airbag out of the housing to a substantially horizontally oriented opening formed in a dashboard of the vehicle, substantially laterally moving, e.g., toward the A-pillar, the first and second chambers by inflating the first chamber, and moving the second chamber toward a vehicle seat by inflating the second chamber via the overflow opening.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

FIG. 2.1 shows a cross section of the airbag of FIG. 1.

FIG. 2.2 shows a plan view of the airbag of FIG. 1.

FIGS. 3.1–3.4 are top plan views illustrating different stages of the airbag of FIG. 1 as it is being deployed.

FIGS. 4.1 to 4.8 are side and top plan views illustrating different stages of the airbag of FIG. 1 during its packaging.

FIG. 5.1 shows a section through a front passenger's airbag module of FIG. 1, arranged below the dashboard.

FIG. 5.2 shows a plan view of FIG. 5.1.

FIGS. 8a–c show different embodiments of airbag modules according to the present invention.

FIGS. 9a–h show different shapes of the airbag housing according to the present invention.

DETAILED DESCRIPTION

Figure 1:
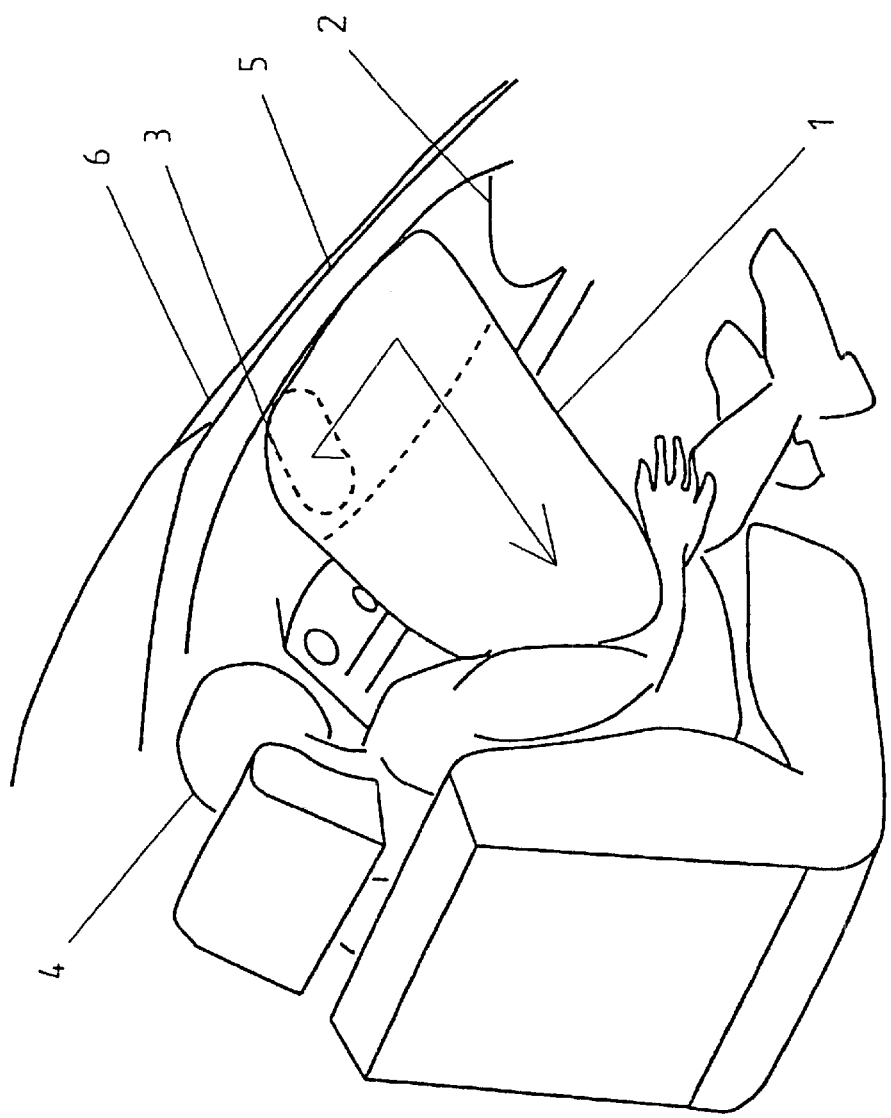
FIG. 1 shows the deployment trajectory of an airbag of a front-passenger airbag module according to the present invention.

FIG. 1 schematically illustrates a front passenger 4 in a motor vehicle, with a front passenger airbag module activated to deploy its airbag 1 in front of the passenger 4. In this embodiment, the airbag module, together with its airbag 1, is arranged under the front dashboard 2, in the center of the vehicle. The connecting point of the airbag with a module housing 16 can be located on the upper side of the dashboard 2. The dashboard 2 has a substantially horizontally oriented outlet opening 3 on the upper side of the dashboard 2 at the center of the vehicle. This outlet opening 3 is situated on the front left of the front passenger 4. A conventional front airbag would deploy essentially left and upwardly next to the front passenger 4, and thus could not provide sufficient protection for the front passenger during a frontal impact. Because the airbag module is installed in the center of the dashboard, the space below the dashboard in the region of the glove compartment is free for other uses.

In the embodiment of FIG. 1, the airbag module is arranged so that, in spite of the location and orientation of the outlet opening 3, the airbag 1 deploys in front of, toward the passenger. The arrow shows that the airbag deploys sequentially in three phases. In the first phase, the airbag deploys substantially upwardly, out of the housing to the opening 3. In the second phase, it deploys out of the opening 3, substantially laterally or transversely (relative to the vehicle), substantially along the windshield 6, toward the front-passenger side A-pillar 5 of the vehicle. This positions the airbag in front of the front passenger, symmetrically with respect to the front passenger's centerline S. See FIG. 3.3. In the third phase, after the airbag has been centered on the front passenger, it deploys toward the front passenger 4.

FIG. 2.1 schematically illustrates an unfolded airbag 1 (illustrated as slightly filled for better illustration thereof). This airbag 1 comprises a lower fabric panel 7 and an upper fabric panel 8 connected to each other, such as with a circumferential seam 9. The airbag 1 further includes a single-piece pocket 10 therewithin, which is the part of the airbag deploying in the second phase, i.e., along the windshield 6. See FIGS. 3.1–3.4. This pocket 10 is sewn with the lower and upper panels 7, 8, along a portion of the circumferential seam 9. The pocket 10 is furthermore connected in about its central region to the lower panel 7 and the upper panel 8 by respective seams 11 and 12 or catch straps, which run in a curved manner. See FIGS. 2.1–2.2. This pocket is thus connected to the opposite sides of the airbag, at at least one point on each side. These seams 11, 12 restrict the expansion of the pocket 10 and of the airbag 1 in the vertical direction to allow the airbag to stably rest flatly on the dashboard 2. The front edge 13 of the pocket 10 runs substantially transversely with respect to the front passenger 4 before the third phase begins. See FIG. 3.3. In this airbag arrangement, the opening connecting the airbag to the module is provided in the region of the lower panel 7.

The pocket 10 forms a first, smaller chamber that is shorter transversely with respect to the front edge 13 than a second chamber 14, which is formed by the remaining region of the airbag. It is expedient for the first chamber 10 to be shorter and therefore smaller transversely with respect to the separation line than the second chamber 14. As a result, in an early phase, the airbag can predominantly deploy transversely with respect to the passenger, enabling the rest of the airbag to be brought into the position required in the event of a crash. A connecting or inflow opening 15 for binding the airbag 1 to a module housing 16 (see FIG. 5.1) is provided in the first chamber 10, on a side facing the center of the vehicle. An overflow opening 17 to the second chamber 14 is provided on the opposite side of the first chamber 10, which side faces the right-hand side of the vehicle. In addition, a further overflow opening 27 for relieving the load of the first chamber 10 can be located on the side facing the center of the vehicle. In the present case, the connection opening 15 can be rectangular with rounded corners. The longitudinal axis B of the inflow opening 15 is positioned about 45° clockwise with respect to a longitudinal axis A of the airbag, which axis A extends substantially parallel to the longitudinal axis of the vehicle after the airbag 1 is deployed, and also with respect to the longitudinal axis C of a connection opening 18 (see FIG. 3.1) on the module housing 16.

When the airbag is installed at the connection opening 18, the airbag becomes twisted or rotated about 45° clockwise so that the two openings 15 and 18 are aligned with each other. Because of this twisting, the airbag extends obliquely in the direction of the front passenger in an unfolded, non-inflated position.

After igniting the gas generator 26, the airbag 1 initially deploys upwardly out of the dashboard, as is illustrated in FIG. 3.1. The angle X° between the front edge of the pocket 10 and the inflow opening 15 corresponds to that of the unused airbag of FIG. 2.2. In the second phase, gas continues to flow into the pocket 10, so that it is filled beginning from the center of the vehicle toward the A-pillar 5, i.e., substantially transversely with respect to the front passenger 4. As the pocket 10 expands against a supporting force k at the windshield 6, a torque M is produced on the airbag mount in the region of the connection opening 15. The torque M rotates the airbag 1 so that folds F form, as is illustrated in FIG. 3.2.

Subsequently, the larger part of the airbag 1, which predominantly comprises the chamber 14, is filled in the direction of the front passenger 4 via the overflow opening 17 (see FIG. 3.3). In the process, the supporting forces k at the windshield 6 continue to rise until the torque M rotates the airbag at the airbag mount in the region of the connection opening 15 through 45° (FIG. 3.4), so that there is now an angle of X+45° between the longitudinal axis C of the module-housing connection and the front edge 13 of the pocket 10. During the further deployment, increasingly larger folds F appear in the airbag at the airbag mount.

From FIGS. 3.3 and 3.4 it can be seen that in spite of the asymmetrical position of the connection opening 15 with respect to the central line S of the front passenger, the airbag 1 is positioned substantially symmetrically with respect to the front passenger, so that the airbag subsequently deploys in the direction of the lap of the front passenger 4.

This deployment can be assisted through certain extent by a folding pattern of the airbag. The folding package is realized here in three parts. As can be seen from FIGS. 4.1 and 4.2, a first part 23 of the unfolded airbag 1 is tucked in under a second part 24 as it is placed into the folding apparatus, which is equipped with slides 19, 20, 21. These two parts 23, 24 essentially form the pocket 10 and the second chamber 14 of the airbag 1. The airbag 1 is then pushed together to the width of the module with the slides 19 and 20, as can be seen from FIGS. 4.3 and 4.4. The airbag is subsequently pressed into the module with the slide 21 and a punch 22, as is illustrated in FIGS. 4.5 and 4.6. Finally, the third part 25 is folded onto the part of the airbag that has already been stowed.

The position of the folded airbag 1 in the module housing 16 can be seen from FIGS. 5.1 and 5.2. In the module housing 16, a tubular gas generator 26 stands on one side. The first part 23 substantially lies next to the tubular gas generator 26 and the second part 24 lies above the first part, likewise next to the tubular gas generator 26. The third part 25, which also extends above the tubular gas generator 26, lies over the second part.

After the gas generator is ignited, the third part 25 deploys upwardly out of the dashboard, subsequently, the second part 24, which is essentially formed by the pocket 10, deploys, and finally, the first part 23, which essentially constitutes the second chamber 14, deploys, in this sequence. The deployment trajectory aimed according to the invention is further optimized by the use of this folding arrangement.

Figure 6:
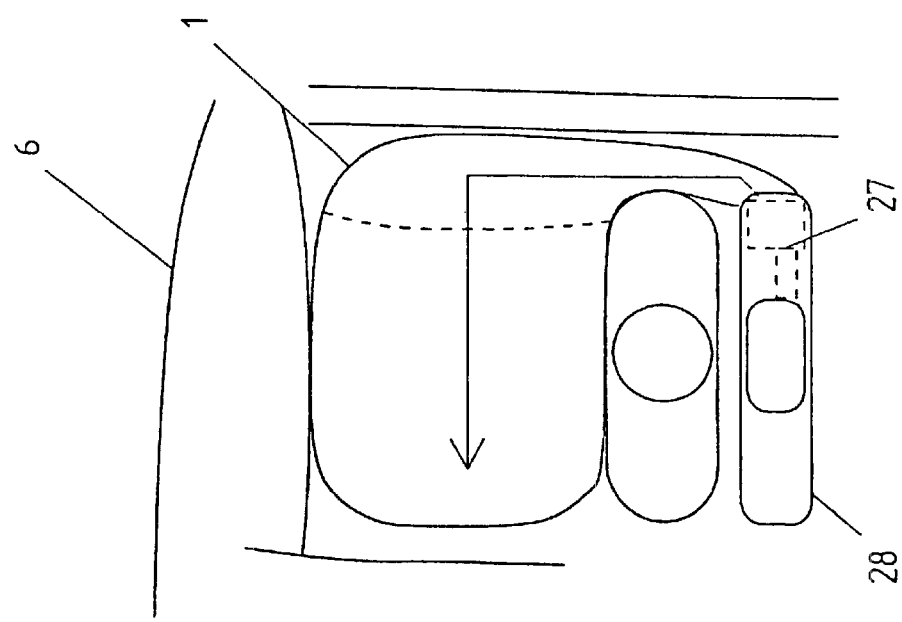
FIG. 6 shows another embodiment of a front-passenger airbag module according to the present invention, which airbag module is installed in the seat back.

FIG. 6 illustrates another embodiment of an airbag module 27, which is arranged in the seat back 28, for a front passenger. The same embodiment is also possible for the driver's side.

Figure 7:
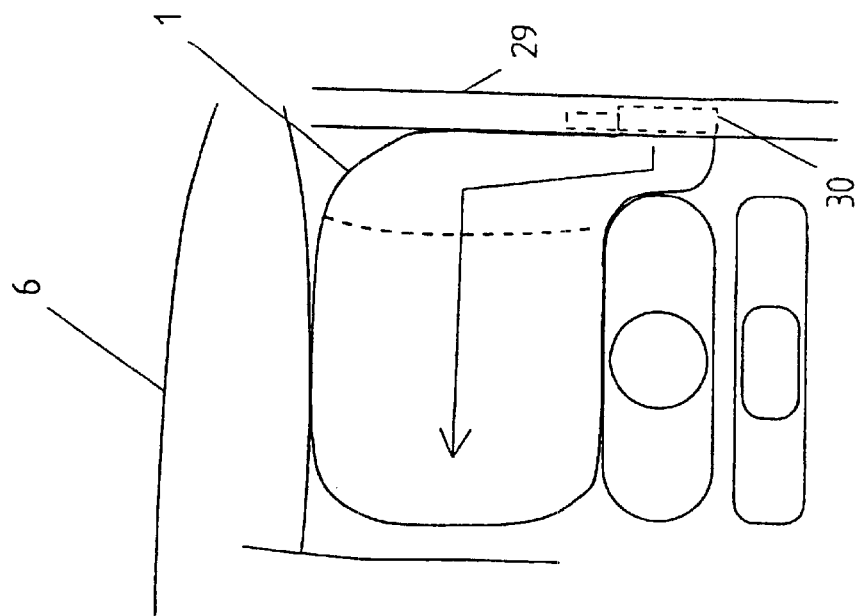
FIG. 7 shows yet another embodiment of a front passenger airbag module according to the invention, which airbag module is installed in the vehicle door.

FIG. 7 illustrates another embodiment of an airbag module 30, which is arranged in the in a vehicle door 29, for a front passenger. The same embodiment is also possible for the driver's side.

FIGS. 8a to 8c illustrate three different embodiments of the airbag module in side views. A rectangular module housing 31 and 32, which have different heightwidth ratios, can be seen in each case. A respective tubular gas generator 33 is assigned at different points to these module housings.

FIGS. 9a to 9h illustrate airbag modules in plan view. The different shapes of the module housing 34 and the different assignment of the tubular gas generator 33 can be seen.

According to the present invention, the airbag can be manipulated to deploy toward the passenger, namely by sequentially deploying various parts of the airbag, in a number of different directions, at different times. Even when the airbag is arranged not directly in front of the passenger, reliable deployment in the direction of the passenger to be protected is ensured.

The effect achieved by this arrangement of the airbag module is that the airbag is deployed first in the direction of the axis of the connection opening. If this axis does not run transversely with respect to the occupant, in the second deployment phase, the airbag is deployed transversely with respect to the passenger and with respect to the longitudinal axis of the vehicle because of the separation essentially running transversely. The arrangement according to the invention applies a torque to the first chamber by means of which the airbag can be reliably brought into the position for protecting the passenger. In a third deployment phase, the gas then enters into the second chamber through the overflow opening, with the result that the airbag is deployed in the direction of the front seat or the passenger. The final deployment takes place from the front of the passenger, so that there is no risk of the airbag striking the passenger sideways.

The disclosure of the parent application, PCT/DE99/04030, and its priority application, DE 198 60 932.9, in their entirety, including the drawings, claims, and the specification thereof, is incorporated herein by reference.

We claim:

1. An airbag module comprising:
   a module housing having a connection opening;
   an airbag having a connection opening, the airbag being connected to the housing with the connection openings being aligned, the airbag having a first chamber, a second chamber separated from the first chamber by a separation line, and an overflow opening communicating the first and second chambers; and
   a gas generator for supplying gas to the airbag via the connection openings,
   wherein the airbag connection opening is provided on one side of the first chamber and the overflow opening is provided on an opposite side of the first chamber,
   wherein when the airbag deploys, the separation line between the first and second chambers is adapted to be positioned substantially transversely with respect to a longitudinal axis of the vehicle, and
   wherein the airbag is twisted about the module housing, substantially about an axis of the housing connection opening so that as the first chamber inflates, the first chamber rests against a vehicle part and generates a torque against the vehicle part against which the first chamber is stably positioned,
   wherein the second chamber expands in front of and toward a vehicle seat after the first chamber has been stably positioned.

2. An airbag module according to claim 1, wherein the first chamber is shorter and smaller than the second chamber.

3. An airbag module according to claim 2, wherein the smaller chamber comprises a separate pocket provided in the airbag.

4. An airbag module according to claim 3, wherein the pocket is connected to opposite sides of the airbag at at least one point on each side.

5. An airbag module according to claim 4, wherein the pocket is connected to the opposite sides of the airbag via seams or catch straps.

6. An airbag module according to claim 5, wherein the airbag has a lower panel and an upper panel connected to each other with a circumferential seam, the lower panel having the airbag connection opening that connects the airbag to the module housing.

7. An airbag module according to claim 6, wherein the pocket is attached to the circumferential seam and is connected in a central region in a curved manner to the lower and upper panels.

8. An airbag module according to claim 1, wherein the airbag is rectangular and has rounded corners in an unfolded, non-inflated state.

9. An airbag module according to claim 1, wherein the airbag is configured to deploy in three sequential phases, which comprises a) a first phase in which the airbag deploys vertically out of the housing connection opening, b) a second phase in which the airbag deploys substantially laterally, and c) a third phase in which the airbag deploys rearwardly, toward the passenger.

10. An airbag module according to claim 1, wherein the module housing is cupshaped for accommodating the airbag in a folded, uninflated state, and adapted to be arranged under a vehicle dashboard, into which the gas generator protrudes from below.

11. An airbag arrangement for a vehicle, comprising:
an airbag module comprising:
a module housing having a connection opening;
an airbag having a connection opening, the airbag being connected to the housing with the connection openings being aligned, the airbag having a first chamber, a second chamber separated by a separation line, and an overflow opening communicating the first and second chambers; and
a gas generator for supplying gas to the airbag via the connection openings,
wherein the airbag connection opening is provided on one side of the first chamber and the overflow opening is provided on an opposite side of the first chamber,
wherein when the airbag deploys, the separation line between the first and second chambers is positioned substantially transversely with respect to a longitudinal axis of the vehicle,
wherein the airbag is twisted about the module housing, substantially about an axis of the housing connection opening so that as the first chamber inflates, the first chamber rests against a vehicle part and generates a torque against the vehicle part against which the first chamber is stably positioned,
wherein the second chamber expands in front of and toward a vehicle seat after the first chamber has been stably positioned.

12. An airbag arrangement according to claim 11, wherein the airbag module is arranged along a center of a vehicle dashboard, and the housing connecting opening is located on the upper side of the dashboard facing the center of the vehicle, and the overflow opening is provided on a side of the airbag facing the right-hand side of the vehicle, and wherein the airbag in an unfolded, non-inflated position extends obliquely in the direction of a front passenger.

13. An airbag arrangement according to claim 11, wherein the airbag is folded and positioned inside the housing with the airbag connection opening downward, and the first and second chambers tucked inside the housing, and the rest of the airbag lying over in the module housing.

14. An airbag arrangement according to claim 11, wherein the airbag is twisted about 45° with respect to the longitudinal axis of the vehicle.

15. An airbag arrangement according to claim 11, wherein the vehicle part is a windshield or an A-pillar of the vehicle.

16. An airbag arrangement according to claim 11, wherein the housing has a cup shaped and arranged under a vehicle dashboard into which the gas generator protrudes from below.

17. A method of inflating airbag in a vehicle, comprising the steps of:
providing an airbag module comprising:
a module housing having a connection opening;
an airbag having a connection opening, the airbag being connected to the housing with the connection openings being aligned, the airbag having a first chamber, a second chamber separated by a separation line, and an overflow opening communicating the first and second chambers; and
a gas generator for supplying gas to the airbag via the connection openings,
providing the airbag connection opening on one side of the first chamber and the overflow opening on an opposite side of the first chamber,
placing the separation line between the first and second chambers substantially transversely with respect to a longitudinal axis of the vehicle,
connecting the airbag twisted about the module housing, substantially about an axis of the housing connection opening so that as the first chamber inflates, the first chamber rests against a vehicle part and generates a torque against the vehicle part against which the first chamber is stably positioned,
inflating the second chamber after the first chamber has been stably positioned.

* * * * *

UNITED STATES PATENT AND TRADEMARK OFFICE
CERTIFICATE OF CORRECTION

PATENT NO.      : 6,607,210 B2                                      Page 1 of 1
DATED           : August 19, 2003
INVENTOR(S)     : Nick Eckert et al.

It is certified that error appears in the above-identified patent and that said Letters Patent is hereby corrected as shown below:

<u>Title page,</u>
Item [73], should read -- [73] Assignee: Takata-Petri AG, Aschaffenburg (DE) --

Signed and Sealed this

Thirteenth Day of January, 2004

JON W. DUDAS
*Acting Director of the United States Patent and Trademark Office*